US008229300B2

(12) United States Patent
Bogoni et al.

(10) Patent No.: US 8,229,300 B2
(45) Date of Patent: Jul. 24, 2012

(54) OPTICAL SWITCH CONTROLLER

(75) Inventors: Antonella Bogoni, Montova (IT); Luca Poti, Pisa (IT); Nicola Andriolli, Pisa (IT); Mirco Scaffardi, Parma (IT); Gianluca Berettini, Pisa (IT); Piero Castoldi, Pisa (IT)

(73) Assignee: Ericsson AB, Stockholm (SE)

( * ) Notice: Subject to any disclaimer, the term of this patent is extended or adjusted under 35 U.S.C. 154(b) by 1138 days.

(21) Appl. No.: 12/027,579

(22) Filed: Feb. 7, 2008

(65) Prior Publication Data

US 2009/0034970 A1 Feb. 5, 2009

(30) Foreign Application Priority Data

Jul. 31, 2007 (WO) ................ PCT/EP2007/057920

(51) Int. Cl.
*H04J 14/00* (2006.01)
(52) U.S. Cl. ................ 398/45; 398/49; 398/50; 398/51; 398/54; 398/61
(58) Field of Classification Search .................... 398/45, 398/49, 51, 54, 61; 370/214, 216, 218
See application file for complete search history.

(56) References Cited

U.S. PATENT DOCUMENTS

| | | | | | |
|---|---|---|---|---|---|
| 4,417,334 | A | * | 11/1983 | Gunderson et al. | 370/402 |
| 6,525,851 | B2 | * | 2/2003 | Chang et al. | 398/166 |
| 6,559,984 | B1 | * | 5/2003 | Lee et al. | 398/5 |
| 6,943,925 | B1 | * | 9/2005 | Islam | 359/108 |
| 6,957,018 | B2 | * | 10/2005 | Araki et al. | 398/51 |
| 7,200,329 | B2 | * | 4/2007 | Lee et al. | 398/50 |
| 7,764,881 | B2 | * | 7/2010 | Aoki | 398/2 |
| 2001/0017723 | A1 | * | 8/2001 | Chang et al. | 359/128 |
| 2005/0185958 | A1 | * | 8/2005 | Atsumi et al. | 398/49 |
| 2007/0086780 | A1 | | 4/2007 | Islam | |

FOREIGN PATENT DOCUMENTS

EP 1061763 A2 12/2000

OTHER PUBLICATIONS

"Indicate—Definition and More from the Free Merriam-Webster Dictionary." Dictionary and Thesaurus—Merriam-Webster Online. Web. Jan. 23, 2012. <http://www.merriam-webster.com/dictionary/indicate>.*
Genda, K. et al. "A 160-Gb/s ATM Switching System Using an Internal Speed-up Crossbar Switch." Proceedings of the Global Telecommunications Conference (GLOBECOM), vol. 1 of 3, Nov. 28, 1994, pp. 123-133. XP000488530.
Stampoulidis, L. et al. "ARTEMIS: A 40 Gb/s All-Optical Self-Router using Asynchronous Bit and Packet-Level Optical Signal Processing." 2005 Global Telecommunications Conference, vol. 4, Nov. 28, 2005, pp. 2035-2040. XP010879541.

* cited by examiner

*Primary Examiner* — Nathan Curs
*Assistant Examiner* — Tanya Ngo
(74) *Attorney, Agent, or Firm* — Coats & Bennett, P.L.L.C.

(57) ABSTRACT

An optical switch controller controls an optical interconnection network that variably connects at least one input data channel to a plurality of outputs channels via at least one switching element. An address reader module has at least one semiconductor optical amplifier optically processes an optical signal. The address reader module obtains information by reading a data tag from the input data channel, and outputs an address control signal based on the information. The address control signal can be used to control switching elements in the optical interconnection network.

11 Claims, 7 Drawing Sheets

OPTICAL SWITCH CONTROLLER

RELATED APPLICATIONS

This application claims priority from foreign application PCT/EP2007/057920. That application, which is entitled, "An Optical Switch Controller" and was filed on Jul. 31, 2007, is incorporated herein by reference in its entirety.

FIELD OF INVENTION

This invention relates to an optical switch controller and in particular, but not exclusively, to a controller arranged to control a cross-bar optical interconnection network.

BACKGROUND OF INVENTION

High performance computing systems, including network systems and the like, presently exploit, amongst other things, electronic interconnection networks to allow for the transfer of data between and within such systems.

Such interconnection networks are typically composed of digital electronics, which are arranged to process signals at very high speeds. There are however limitations with the digital electronics that are used presently within such systems when they are required to process signals at very high speeds. The logic gates that are often used in such interconnection networks are unable to sufficiently quickly change state to cope with the high speed demands required from modern telecommunications equipment. Whereas telecommunications once only transmitted low bandwidth voice information, it is now required to transmit video and data information, which requires much greater bandwidth particularly as video quality moves to high definition television and high performance computing systems increase their processing capabilities. Electronic devices are reaching fundamental limits at these high bandwidths in terms of their power consumption, wiring density and throughput.

SUMMARY OF THE INVENTION

According to a first aspect of the invention there is provided an optical switch controller arranged to control an optical interconnection network arranged to variably connect at least one input data channel to a plurality of output channels via at least one switching element, comprising: an address reader module arranged to obtain information by reading a data tag from the at least one input data channel, and output at least one address control signal based upon the information read from the data tag, in which the address control signal can be used to control switching elements in an interconnection network; wherein the address reader module comprises at least one semiconductor optical amplifier and is arranged to carry out the signal processing optically.

Such an arrangement is advantageous as it allows for an interconnection network to route data from an input to an output, wherein all the processing in the network can be achieved optically. In such an arrangement both the controller and the interconnection network can be operated at higher speeds when compared to opto-electronic controllers. Such arrangements may also use less power and have a reduced susceptibility to electromagnetic interference when compared with electronic and opto-electronic controllers.

The controller may comprise also an output stage arranged to receive the address control signal and to output an output signal based upon the address control signal, which can be used to control switching elements in an interconnection network. Such an arrangement may be advantageous as it may allow for a further module to be provided between the address reader module and the output signal. Such an arrangement may be advantageous as it may allow for the output signal to be further conditioned, e.g. not transmitted, in the event of a request from further logic within the controller, or at the user's request, etc.

In a manner similar to that stated above, the output stage may comprise at least one semiconductor optical amplifier which is arranged to carry out the signal processing optically. Such an arrangement may be advantageous as it would allow for signal processing in the controller to remain optically.

The controller may further comprise a comparator stage arranged to read the data tag from at least two input data channels and output at least one comparator output signal indicating if the information within the data tags on the at least two input data channels is the same or different; and wherein the output stage is arranged such that the output signal is additionally based upon the comparator output signal.

Such an arrangement may be advantageous, as it may allow for the controller to control the flow of data within an interconnection network where it has established that the data from two data input channels is directed to the same output channel. This may be achieved by providing a comparator stage that is able to read the destination address from the data tag.

The controller may further comprise: a contention manager arranged to read priority information from the data tag from at least two input data channels and output at least one priority output signal according to the priority information wherein the output signal from the output stage is additionally based upon the priority output signal.

In a manner similar to that stated above, this may allow for the controller to control the flow of data within an interconnection network where it has established that the data from two data input channels is directed to the same output channel, by allowing for each data tag to be provided with a priority data.

In such an arrangement the contention manager may be arranged to generate the priority output signal such that it is indicative of the priority information within a data tag being less than the priority information in another data tag.

Additionally, contention manager may be further arranged to employ a tie-breaker arranged to determine which input data channel should be connected to which output in the case that two data tags from different input data channels are to be concurrently connected to the same output channel with the same priority.

One or both of the comparator stage and the contention manager may comprise at least one semiconductor optical amplifier arranged to carry out the signal processing optically. This would allow the controller and the interconnection network to be operated at higher speeds, using less power, and have a reduced susceptibility to electromagnetic interference compared with electronic and opto-electronic controllers.

The controller may further comprise an extinction line, arranged to provide an extinction signal to an interconnection network, indicating that a packet on an input data channel should be erased. Such an arrangement may allow for the controller to actively provide a signal that would erase a packet which may have, for example, the same destination address, but have a lower priority than a packet travelling on an alternative input data channel.

The optical controller may be arranged to control a 4×4 interconnection network. Such an arrangement may be advantageous as it may provide an efficient framework for using optical processing.

According to a second aspect of the invention there is provided a method of optically controlling an interconnection network arranged to variably connect at least one input data channel to a plurality of output channels via at least one switching element, comprising the steps of: providing an address reader module; reading information within a data tag from the at least one input data channel using the address reader; processing the information to provide at least one address control signal based upon the information read from the data tag; using the address control signal to switch switching elements within an interconnection network; wherein both the steps of reading the data tag and processing the information is carried out optically using at least one semiconductor optical amplifier.

BRIEF DESCRIPTION OF INVENTION

There will now be described by way of example only one embodiment of the present invention with reference to and as illustrated in the accompanying drawings of which:

FIG. 3a shows a schematic illustration of an optical gate that can be used as a building block to implement the comparators of FIG. 2.

FIG. 3b is a truth table for the logic gate of FIG. 3a

DETAILED DESCRIPTION OF THE INVENTION

Figure 1:
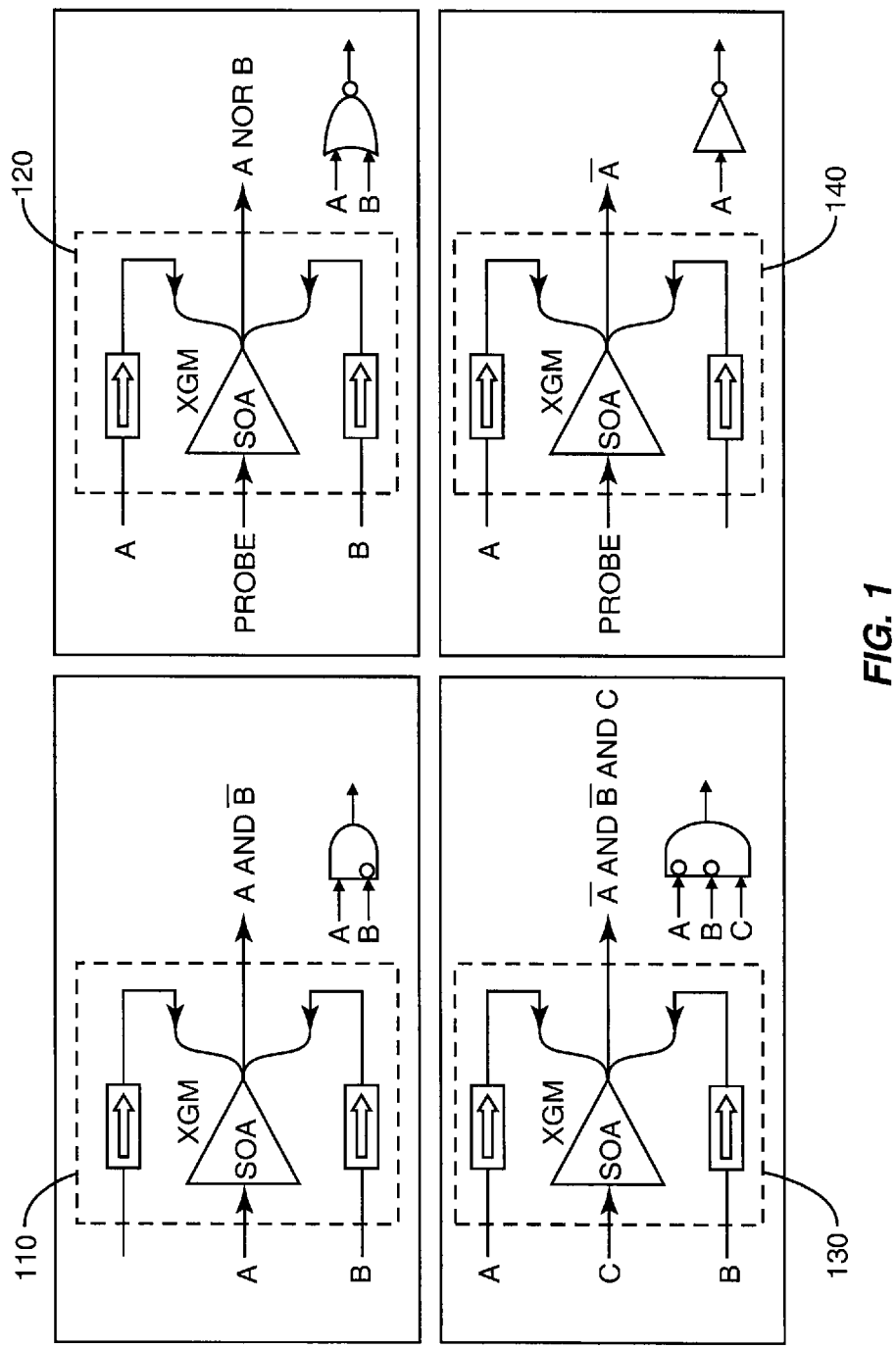
FIG. 1 shows four optical logic modules.

FIG. 1 details four logic modules 110, 120, 130, 140 each of which includes a semiconductor optical amplifier (SOA), in which the counter propagating signals interact by means of cross gain modulation (XGM). The modules in FIG. 1 detail the following logic: 'A AND NOT B' 110, 'A NOR B' 120, 'NOT A AND NOT B AND C' 130, and 'NOT A' 140. The operation of such SOAs will be well known to those in the art and are arranged to provide logic functions in the optical domain.

Figure 2A:
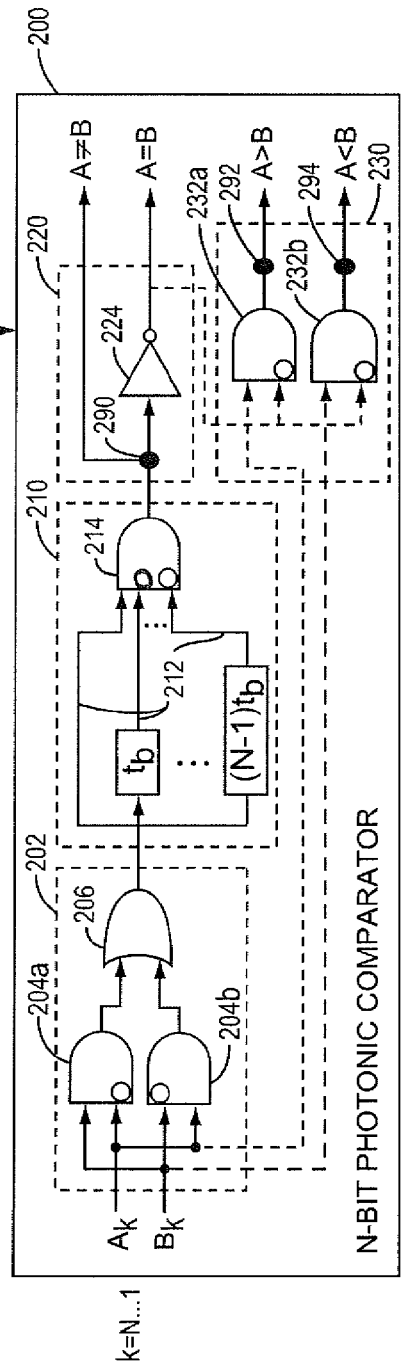
FIGS. 2A and 2B show N-bit and 1-bit optical comparators, comprising the logic modules of FIG. 1.
Figure 2B:
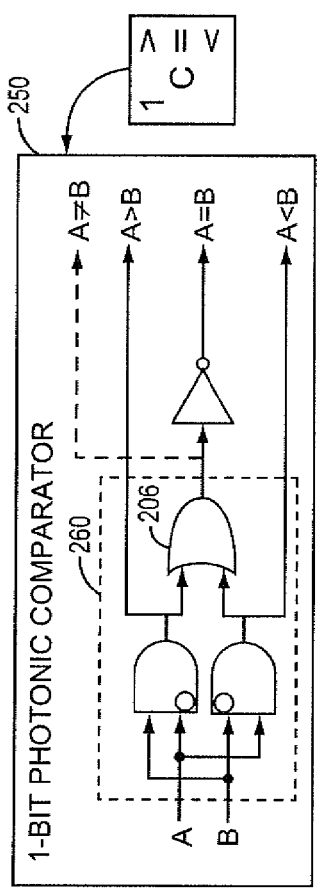

FIGS. 2A and 2B detail two comparators used in the embodiment being described. FIG. 2a details an N-bit photonic comparator 200, while FIG. 2b details a 1-bit photonic comparator 250. Each comparator comprises a combination of one or more of the optical logic modules 110, 120, 130, 140, as shown in FIG. 1, as well as a further optical OR logic gate 206, which may be implemented with an optical coupler. It will readily be appreciated to a person skilled in the art that the logic as described in the comparators 200, 250 below is not limited to this present single embodiment and that the same logic may be implemented in an alternative manner, with an alternative configuration of logic modules 110, 120, 130, 140. For example, to obtain the logic 'A NOR B', it is also possible to combine 'NOT A' with 'A AND NOT B'.

In FIG. 2a the N-bit comparator 200 receives as its input a pair of N-bit words $A_K$ and $B_K$ where k=N . . . 1. The N-bit comparator 200 comprises a combination of optical logic gates and delay lines which together provide an output the logical functions A=B, A 'not equal to' B, and also A>B and A<B.

The first stage 202 of this optical circuit comprises two AND logic gates 204a 204b and an OR logic gate 206. Each AND logic gate 204a, 204b comprises two inputs, one of which is inverted, while the OR logic gate 206 comprises two inputs and one output. The output of both AND logic gates 204a, 204b provide the inputs to the two-input OR logic gate 206. Both lines A and B are arranged to be input on one non-inverted AND input and one inverted AND input of the other gate. The combination of these three gates provides the logic of an XOR gate. The first stage 202 and combination of logic within may therefore be considered as an XOR gate 202.

Each pair of corresponding bits $A_K$, $B_K$ of the signals A, B are passed in sequence through the first stage, or the so-called XOR gate 202. By this it is meant that at a first instance the most significant bits $A_N$ and $B_N$ are input to the N-bit comparator 200 to give a first output bit, then the next most significant bits $A_{N-1}$, $B_{N-1}$ to give the next output bit and so on until the least significant bits $A_1$, $B_1$ are passed to the XOR gate 202 to give the last bit of the output. There will therefore be an N bit word produced with one bit being produced at any given time.

If the two bits $A_K$, $B_K$ passed to the XOR gate 202 are the same, then the output bit of the XOR gate 202 that corresponds to those bits will be logic 0. It will be logic 1 if, and only if, the bits $A_K$ and $B_K$ are different. For any given pair of N bit words there will therefore be a corresponding N bit word produced with a 1 for each pair of bits that do not match and a 0 for each pair that do match. It should be noted that this output word does not provide any information indicative of which of the words A, B is largest.

The next stage of the N-bit comparator 200 circuit is the second stage 210. The second stage 210 comprises a delay line 212, which acts as an optical serial-to-parallel converter. The serial to parallel converter (SPC) 212 in fact comprises a set of N optical connections, the first of which introduces a null delay, and the others have time delays that are different multiples of the time between samples arriving at the XOR gate 202. Coils of optical fibre could be used to provide the required time delays. The delays are typically sequential integer multiples of the clock period. Hence with a clock giving 1 nsecond between beats, and for words of length N, the first line will have multiple M=0 times the clock period, the next M=1 times and so on until the Nth line has a delay equal to M=(N−1) nseconds.

The output of the SPC 212 comprises multiple outputs, whereby the number of outputs is indicative of N bits being compared. For example, if $A_K$ comprises eight bits then the SPC 212 would have eight outputs. Each output is connected, within the second stage 210 to an AND gate 214. In the present embodiment the first input to the AND gate 214 is connected to the output of the XOR gate 202 through the zero delay time optical connection of the SPC 212. The second input is also connected to the output of the XOR gate 202 but this time through a set of N−1 inverters respectively associated with each of the N−1 delayed time lines of the serial to parallel converter. The signals to the second input are therefore delayed and inverted versions of the signals out of the XOR gate 202.

Thus, as the first output bit of the XOR gate 202 is produced, it is passed to the first input of the AND gate 214. At this time no signals are applied to the other inputs to the AND gate 214 (since there are no previous delayed signals to be presented and thus each further delay line is at 0, which causes a 1 at the input to the AND gate 214) so the output of the AND gate 214 will be 0 while the first output bit from the XOR gate 202 is 0, i.e. A=B, and 1 when the first output bit from the XOR gate 202 is 1, i.e. A 'not equal to' B. As the next bit is output from the XOR gate 202 it is applied to the first input to the AND gate 214, and by this time the first bit will have rippled through to the second input of the AND gate 214. Because one of the inputs—the zero-delay input—is not inverted and all the other inputs are inverted, then the output of the AND gate 214 will be 1 only during the first occurrence of a 1 as an output bit from the XOR gate 202, i.e. A 'not equal to' B.

This process is then repeated for each of the N bits of the words A and B, giving an N bit output signal from the AND gate 214. As discussed, as soon as one pair of input bits of A and B do not match then the output of the AND gate 214 will become 1, however for all subsequent samples will always be 0 for the rest of that word.

A third stage 220 in FIG. 2a shows the output stage of the N-bit comparator 200. Stage three 220 is arranged to observe if an output 1 from the second stage AND 214 has been produced at any time during the comparison of the words A, B. A latch, such as a flip-flop, may be provided to achieve this, but in this embodiment a further optical SPC, which comprises an OR logic gate is used as a compare latch 290. The compare latch 290 is arranged to convert the serial bit output of the second stage into a parallel output. The parallel output is then passed through a multiple input OR logic gate (with the number of inputs being indicative of the word length of A,B) so as to provide a logic 1 out as soon as a difference on the bits between A and B has been observed. A person skilled in the art will readily be able to implement such a compare latch 290.

As shown in the FIG. 2a, the output logic 1 is used to indicate that a 1 has been produced at some point in the comparison of the word A, B in the second stage, and thus that A 'not equal to' B. Additionally, this output may be inverted through a final inverter 224 in the third stage 220 such that two output lines are provided from the third stage 220: an A=B output and an A 'not equal to' B output, each of which may be sampled on the final clock of the word length to evaluate of at any point A 'not equal to' B occurred. In each instance, the output that is at the high logic provides the comparison signal.

In addition, as shown in dashed lines in FIG. 2a, the logic A>B and A<B may be ascertained by using a further stage 230, comprising a first AND gate 232a, and a second AND gate 232b. To determine whether A>B, the output from the A=B logic output detailed above is next inverted and passed to the further stage 230 and to the first AND gate 232a. The present bit of word A (i.e. the bit which is input to the XOR gate 202 at that time) is fed to one input of the AND gate 232a along with the inverted bit output A=B from the third stage 220 at that time. If the present bit of A is 1, and the output of the A=B logic is 0 (i.e. A 'NOT equal to' B), then this indicates that A>B and a logic high is output from the further stage 230.

To determine whether A<B, the output from the A=B logic output detailed above from stage three 220 is inverted and passed to the second AND gate 232b in the further stage 230. The present bit of word B (i.e. the bit which is input to the XOR gate at that time) is fed to one input of the AND gate along with the bit output from the A=B logic at that time. If the present bit of B is 1, and the output of the A=B logic is 0 (i.e. A 'not equal to' B), then this indicates that B>A and a logic high is output from the further stage 230.

Compare latches 292, 294 are provided on the output of the first AND gate 232a, and the second AND gate 232b to indicate the logic.

FIG. 2b details a 1-bit comparator 250 of the embodiment being described. In this arrangement only an XOR function 260, similar to the XOR stage 202 of the N-bit comparator 200 is required. In such an arrangement the XOR function 260 provides an instantaneous output of 1 when the values A and B are not equal and an output of 0 when they are. Again, to provide a 1 the output A=B may be inverted for signal conditioning purposes. A<B and A>B may also be ascertained by observing the output of the AND gates within the XOR function 260 as will be readily appreciated.

Figures 3A, 3B:
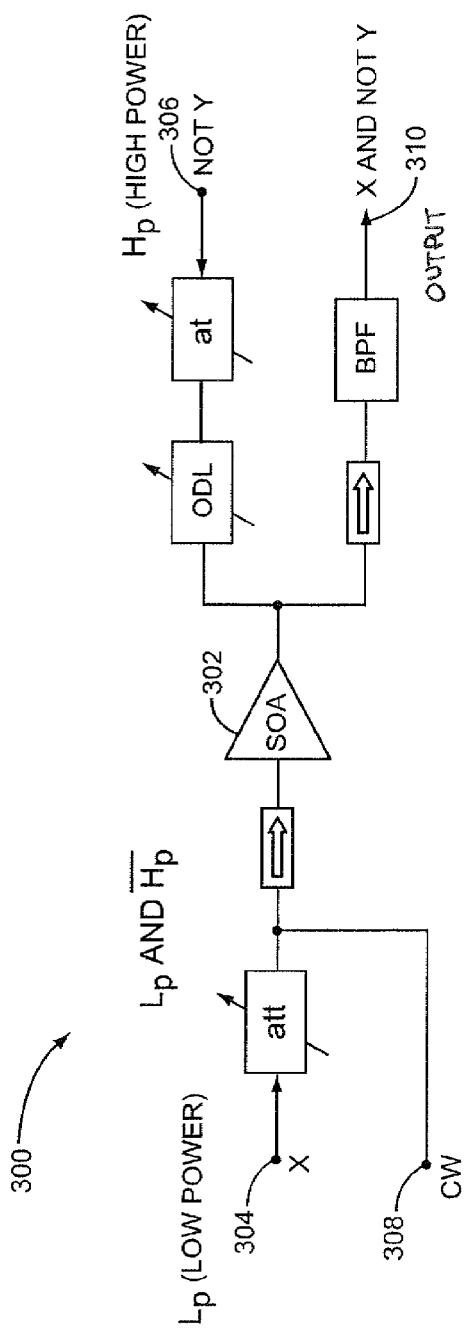

A practical embodiment of the comparator of FIG. 2a can be realised using a set of six semiconductor optical amplifiers (SOAs) configured to provide logical building blocks or logic gates. A gate 300 that provides the functionality (X AND NOT Y) is shown in FIG. 3a.

Each building block for the gate 300 comprises a single semiconductor optical amplifier (SOA) 302 having a first input 304 at one end and a second input 306 at a second end opposite the first. The output from the amplifier 302 is taken to be the signal that passes out of the second end 310 of the amplifier. A characteristic of SOAs 302 is that a gain that is applied to an input signal is influenced by the power of the signals input to the amplifier 302. As the input power increases the gain eventually starts to decrease. A further characteristic is that SOAs 302 are non-linear devices: a signal at one wavelength is able to modulate a signal at another through the well known process of cross gain modulation (XGM).

Coupled to the first end of the amplifier 302 is a continuous wave signal CW 308 of relatively high power and a first, lower power, input signal $L_P$. Coupled to the second end is a second, high power, input signal $H_P$. The two input signals have the same wavelength but the CW 308 is at a different wavelength.

The two counter propagating input signals interact in the SOA 302 so that the low power signal $L_P$ experiences the gain modulation induced by the stronger second input signal $H_P$. The CW keeps the SOAs 302 saturation high, and thus is able to reduce the SOAs recovery time. In effect this means that with no high power signal applied (i.e. $H_P=0$) the output 310 will be 1 when $L_P=1$ and 0 when $L_P=0$. On the other hand, when the high power signal $H_P=1$ is applied, the low power signal $L_P$ experiences a reduced SOA gain such that an the output 310 at all times is 0. The output 310 from the gate 300 therefore corresponds to the function ($L_P$ AND NOT $H_P$). This is shown in the truth table of FIG. 3b of the accompanying drawings. A person skilled in the art will appreciate that CW acts to keep the SOA 302 saturated and to reduce the pattern effect and therefore does not act as a logic signal, per se, although this is still shown in the logic table of FIG. 3b for completeness.

Figure 4:
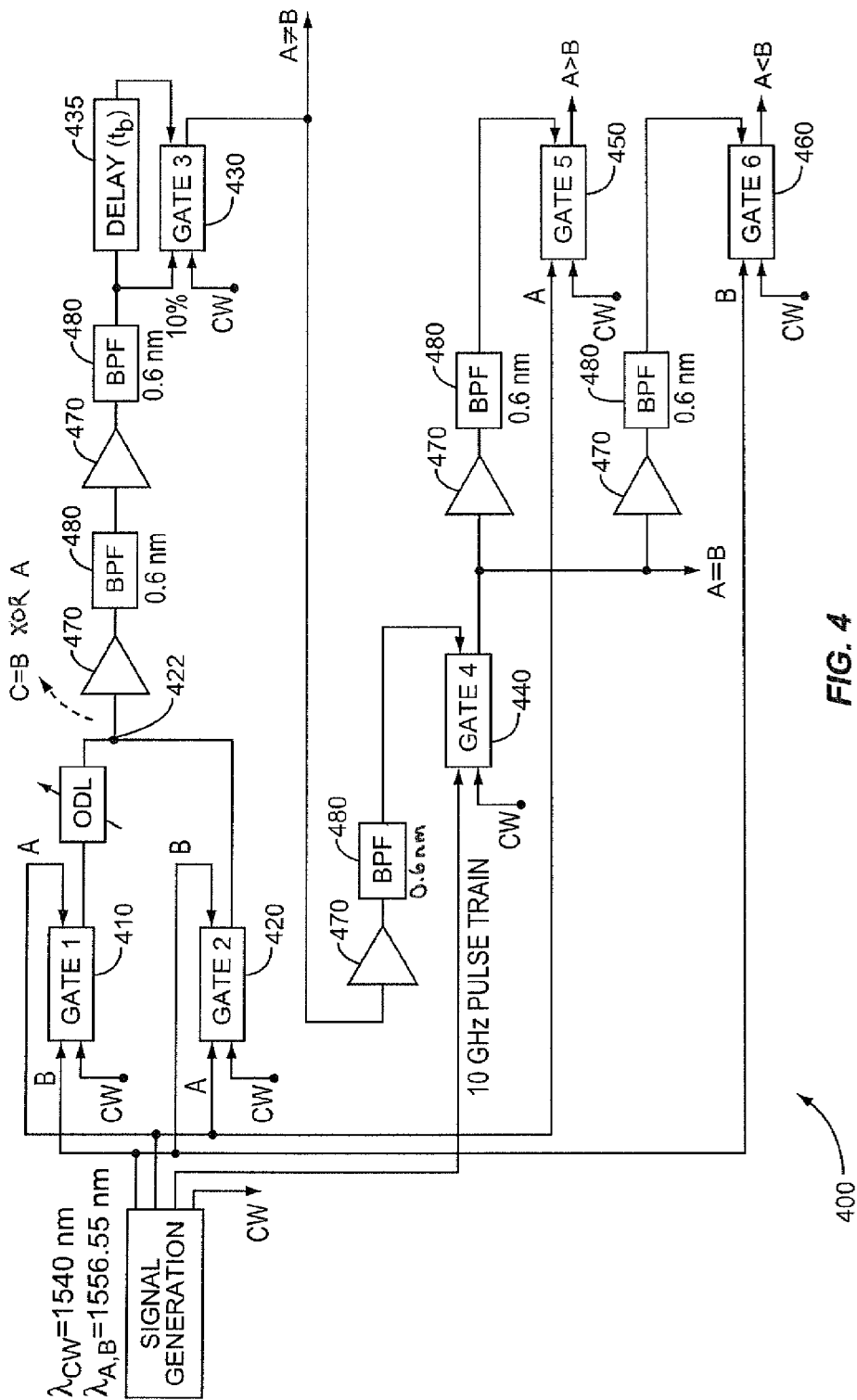
FIG. 4 illustrates an optical circuit in accordance with an embodiment of the invention which functions in accordance with the overview of FIG. 2

Turning to FIG. 4, six gates as shown in FIG. 3a can be connected into a circuit 400 that takes the two N-bit words A, B as its input and provides outputs for A>B, A<B and A=B.

The first part of the circuit 400 of FIG. 2a—the XOR gate 202—is implemented by passing signals A and B to the first and second inputs of a first gate (gate 1) 410 to give an output corresponding to the logical function (A AND NOT B). The same signals are also fed the other way round (to the second and first inputs respectively) to a second gate (gate 2) 420 to give an output corresponding to the function (B AND NOT A). The output of the two gates are then combined using a fibre coupler tail 422 (to give an OR function) so as to provide the function (A AND NOT B) OR (B AND NOT A) which is the same as the function (A XOR B).

The output of the fibre coupler tail 422 is next fed to the first input of a third gate (gate 3) 430 and a delayed version 435 of the same output fed to the second input of the third gate 430. In fact, for an N-bit word there will be N−1 delayed versions 435 fed to the second input, each delayed by one or more samples. Only one delayed input is shown in FIG. 4 for clarity. The output of the third gate will therefore represent the first AND gate 214 function of the circuit of FIG. 2*a*. Note that no additional inverters are needed in this case since the function of gate 3 430 inherently provides the required inversion of the second input.

The output from gate 3 430, indicative of A 'not equal to' B, is then passed to the second input of another gate, gate 4 440. A pulse train synchronised to the sample rate is fed to the first input of gate 4 440, so that the output of gate 4 440 is an inverted version of the signal fed to the second input of gate 4 440 (it is an inverted version of the signal out of gate 3 430). At this stage the output signal of gate 4 is indicative of A=B.

The signal output from gate 4 440 is fed to the second input of gates 5 450 and gate 6 460 respectively. The first input of gate 5 450 is provided with $A_K$ as its input and thus this gate gives as its output an indication of A>B. The first input of gate 6 460 is provided with $B_K$ as its input and thus this gate gives as its output an indication of A<B.

The output from each gate 410, 420, 430, 440, 450, 460 can be passed though an amplifier 470 as required before being fed to a subsequent gate, and may also be passed through a bandpass filter 480.

Figure 5:
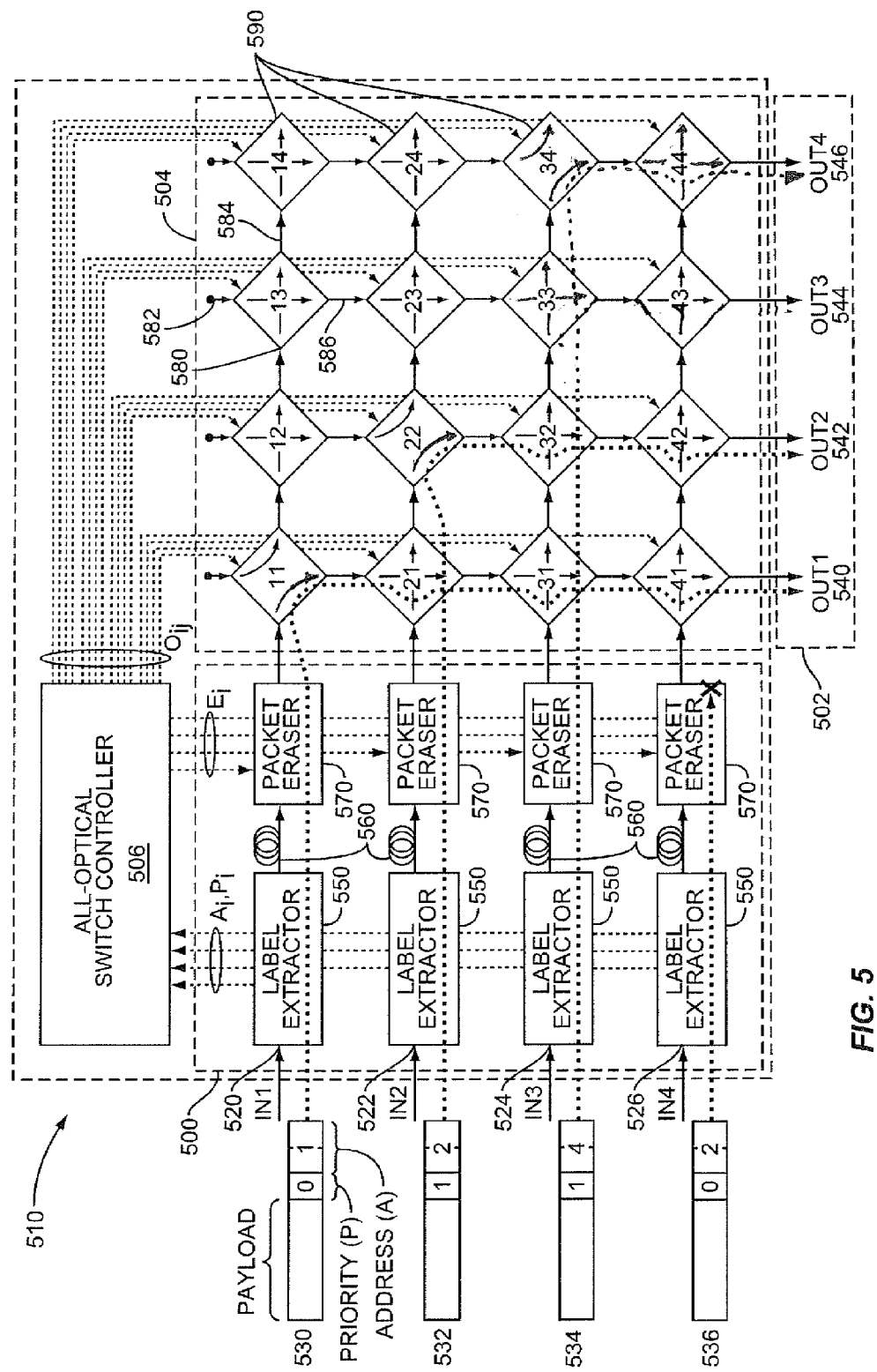
FIG. 5 shows an optical interconnection network according to an embodiment of the present invention.

FIG. 5 shows an optical crossbar interconnection network 510 of the embodiment being described. The network comprises an input stage 500, an output stage 502, a switch bank 504 and a controller 506. In the present embodiment the input stage 500 comprises four input data channels 520, 522, 524, 526, each arranged to transmit optical data from four optical inputs 530, 532, 534, 536. Similarly the output stage 502 comprises four optical output channels 540, 542, 544, 546 arranged to transmit optical data to connected systems.

Each input data channel 520, 522, 524, 526 comprises a label extractor 550. The label extractor 550 is arranged to read optically a data tag from a data-packet being sent on an input data channel 520-526 and communicate this information optically to the controller 506. In the present embodiment each input data channel 520-526 is arranged to transmit data-packets of a fixed length, each packet comprising a payload (i.e. data) and the data tag. In alternative embodiments each input data channel 520-526 may be arranged to transmit packets of a varying length.

As will be readily appreciated the data tag may comprise information regarding the payload, such as the origin of the payload, the destination of the payload, etc. In the present embodiment the data tag comprises information regarding the destination of the payload within the interconnection network, i.e. the address of the output data channel to which the payload is to be routed. The data tag also comprises priority information detailing a priority which has previously been assigned to the payload. Such a priority may for example be used in applications in which a Quality of Service (QoS) is being operated.

Due to fact that present embodiment comprises four optical output channels 540-546 each data tag contains a two-bit output address (because $2^2=4$). In addition each data tag is provided with a priority setting. Such priority settings may be used to indicate the priority of the payload. In the present embodiment, as the priority is 1-bit, the priority can be set to high (1) or low (0). The label extractor 550 is arranged to extract both the destination address data and the priority data in the data tag. This is achieved optically.

The input stage 500 further comprises, on each data channel 520-526, a delay line 560 and a packet eraser 570. The delay line 560 is arranged to produce a delay in the transmission of the data-packet such that the optical controller 506 (as will be described here) has sufficient time to evaluate the destination address (i.e. in this embodiment the correct optical output channel of the network) and priority signals and subsequently control the switch bank 504 accordingly. The packet eraser 570 is also in optical communication with the controller 506 and is arranged to prevent further transmission of a data packet along an input data channel 520-526 at the request of the controller 506 under the control of the controller 506.

The switch bank 504 in the present embodiment comprises a 4×4 array of 590, such as 2×2 switching elements. Each switching element 590 comprises a first input 580 and a second input 582, a first output 584 and a second output 586. In addition each switching element 590 includes an optical gate generator capable of transforming an optical pulse into a gate signal lasting as long as the packet duration through the network. Such switches are well known to a person skilled in the art. A switching element 590, $SW_{ij}$, can be then controlled, via an optical pulse, $O_{ij}$, from the controller 506, to alter the switching element 590 from a first condition to a second condition. In the first, uncontrolled, so-called cross condition an optical signal, such as a data-packet may pass from the first input 580 to the first output 584 within the switching element 590 and an optical signal may pass from the second input 582 to the second output 586. In the second, so-called bar, condition an optical signal may pass from the first input 580 to the second output 586 within the switching element 590 and an optical data signal may pass from the second input 582 to the first output 584. Such switching elements 590 and switch banks 504 are well known within such interconnection networks 510.

Each optical input data channel 520-526 is associated with four switches 590. For example, the first input data channel 520 is in association with $SW_{11}$, $SW_{12}$, $SW_{13}$, and $SW_{14}$. Thus in order to transmit data from the first input data channel 520 to the third optical data output channel 544, then $SW_{13}$ must be activated by the controller 506, while switch $SW_{11}$, $SW_{12}$, $SW_{23}$, $SW_{33}$ and $SW_{43}$ remain in the first, uncontrolled, condition. In such an arrangement an optical data-packet from the input stage 500 passes from the first input data channel 520 to the first input 580 of switch $SW_{11}$ and, as the switch is uncontrolled, the signal passes unhindered to the first output 584 of $SW_{11}$, which is also the first input 580 of $SW_{12}$. Similarly this signal then passes to the $SW_{13}$. Upon reaching $SW_{13}$, the signal is directed from the first input 580 to the second output 586. The second output 586 of $SW_{13}$ being the second input 582 of $SW_{23}$. The signal then transmits through $SW_{23}$ to the second output 586 of $SW_{23}$, which is also the second input 584 of $SW_{33}$. Similarly the signal carries on to $SW_{43}$ and thus to the third optical data output channel 544. In such an arrangement therefore an optical signal can be directed from one input data channel 520, 522, 524, 526 to one output channel 540, 542, 544, 546.

It will readily be appreciated therefore that collision would occur if, in the above example, a separate signal were being sent from a further input data channel (i.e. from any of the second 522, third 524 or fourth 526 input channels) to the third output channel 544. In such an arrangement, the controller 506 is arranged to observe the priority information in the data tags of the data packets travelling on each input data channel 520, 522, 524, 526, and instruct the packet eraser 570 to erase the packet with the lower priority if two or more data-packets are to be sent to the same output channel 540-

546 and thus collide. In this regard the controller 506 may be considered to act so as to resolve any contention. Where the address and the priorities are the same for two or more different data-packets travelling on different input data channels 520-526, then the controller 506 is arranged to implement a so called tie-breaker.

In the present embodiment the tie-breaker is implemented by preference being given to the data packet being transmitted on the lowest numbered data channel, i.e. data packets being transmitted on the first input data channel 520 get preference over the second 522, third 524, and fourth 526 data channels when both the address on the packet being transmitted and the priority are evaluated to be the same. Similarly data packets being transmitted on the second input data channel 522 get preference over the, third 524, and fourth 526, while data packets being transmitted on the third input data channel 524 get preference over the fourth 526 alone. It will be readily appreciated that such tie-breakers may be implemented using alternative conditions, such as preference for highest data channel, or arbitrary selection, or the like. A person skilled in the art will readily appreciate such tie-breaker logic.

In this regard the controller 506 is in optical communication with the input stage 500 and the switch bank 504, and is arranged to control the switch bank 504, using optical logic pulses to allow optical data to flow from each input data channel 520, 522, 524, 526 to the desired output channels 540, 542, 544, 546 depending upon the address, priority information, and originating input data channel 520-526 of the data-tags on each data-packet, as will be described herein.

Figure 6:
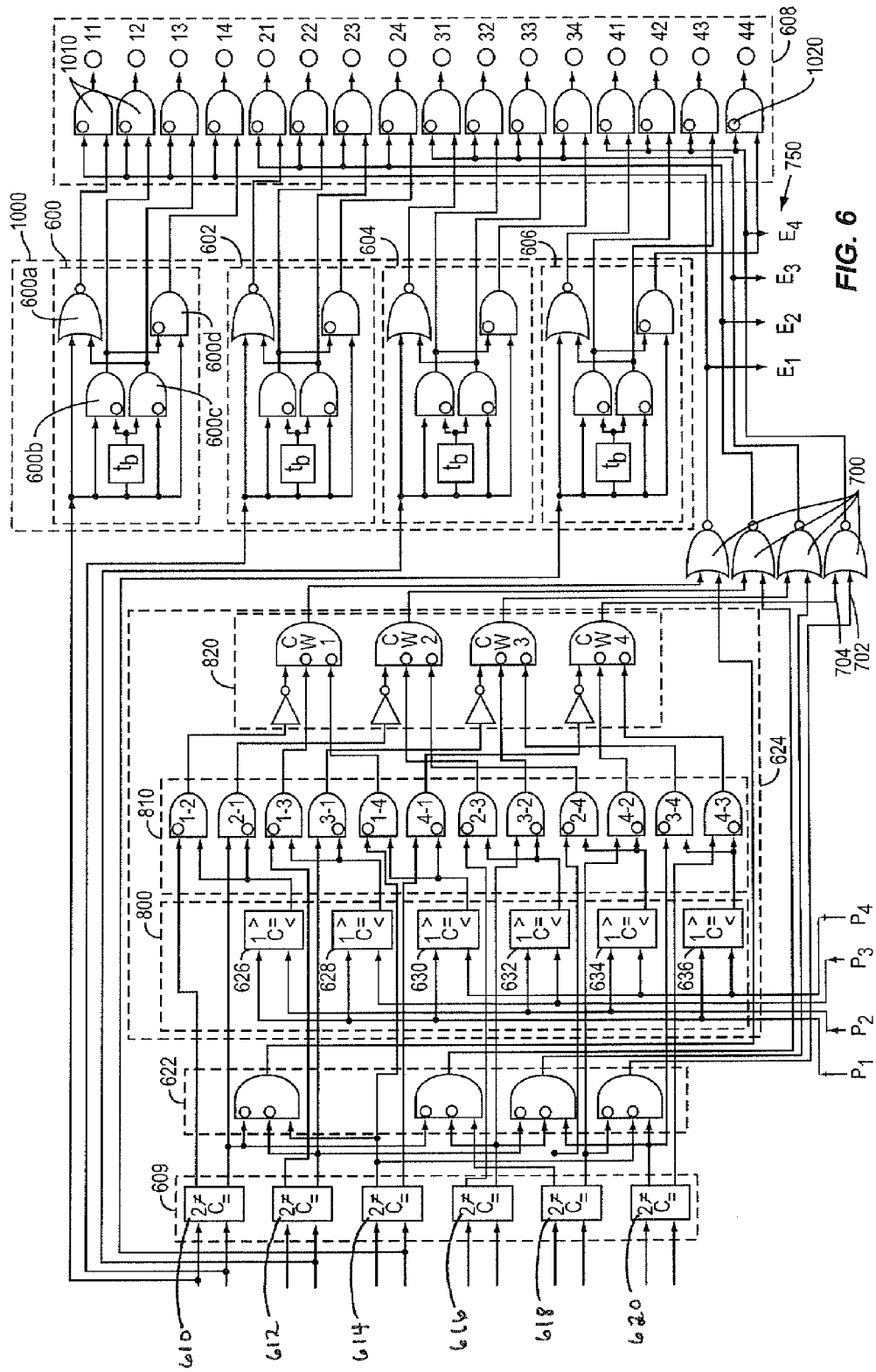
FIG. 6 shows a schematic of an optical controller employed in the interconnection network of FIG. 5.

FIG. 6 details the optical controller 506 of the present embodiment. As will be appreciated the following description is specific to a two-bit optical address system (i.e. four input data channels 520-526 and four output channels 540-546), however it will readily be appreciated how to implement alternative address systems such as three bit (i.e. eight input data channels and eight output channels), or four bit (i.e. sixteen input data channels and sixteen output channels), etc., alternatively the network may comprise any number or inputs and any number of outputs, which may be the same number or different.

In this embodiment, the signal processing is implemented using the optical modular logic as described above (in particular shown in FIGS. 1 and 2). In particular the signal processing used by the controller results in the data being processed entirely within the optical domain. This is to say that aside from optical powering concerns, there is no manipulation, evaluation, etc. of data that occurs electronically: it occurs optically.

Again, it is envisaged that similar logic functions may be possible with alternative combinations of optical logic modules 110, 120, 130, 140, 200, 250, however the following description is given by way of an example of one possible implementation only.

With reference to FIG. 6, the optical controller 506 of the present embodiment comprises an address reader module 1000. The address reader module 1000 comprises four optical address readers 600, 602, 604, 606, each comprising one input and four outputs. The one input is arranged to read optically the address, most significant bit (MSB) first, from a data tag on a data packet on a repetitive input data channel 520-526, each address reader 600, 602, 604, 606 being associated with a separate channel (i.e. address reader 600 is associated with the first input data channel 520, address reader 602 with the second channel 522, address reader 604 with the third channel 524 and address reader 606 with the fourth channel 526). In this embodiment the output address, or 'address' of a data-packet travelling on an input data channel 520-526 is given the nomenclature $A_1$, $A_2$, $A_3$ and $A_4$ meaning, for example $A_1$ being the output address on the data tag on the first input data channel 520, which may be the first, second, third or fourth output channel 540-546.

The controller 506 also comprises an output stage 608 which comprises sixteen AND gates, or so-called switching modules (for example those shown at 1010), whereby each switching module 1010 is associated with one switching element 590 of the switch bank 504. The output stage 608 is arranged to generate output signals which are used to control switching elements in the interconnection network. The output of each AND gate (switching modules 1010) is used therefore to control one of the switching elements 590 in the switch bank 504. When the AND gate 1010, or so-called switching module 1010 provides a high (or logic 1) output, this sends an optical signal, $O_{ij}$ to the corresponding switching element $SW_{ij}$ to switch to the second, or so-called bar, condition.

Each of the AND gates 1010 in the output stage 608 comprises two inputs, one of which is inverted. The non-inverted input of each AND gate 1010 of the output stage 608 is connected to an output from one of the four optical address readers 600-606. It should be noted that each address reader 600-606 has four separate outputs, as described below. For example in the case of the address reader 600, which is associated with the first input data channel 520 ($A_1$), then the four outputs from the address reader 600 are arranged to communicate to the four output ANDs 1010 in the output stage 608 associated with switches $SW_{11}$, $SW_{12}$, $SW_{13}$ and $SW_{14}$ (i.e. to produce, when required, optical signals $O_{11}$, $O_{12}$, $O_{13}$ and $O_{14}$).

Each address reader 600-606 itself comprises one optical NOR, AD-NOR1 600a and three optical ANDs, AD-AND2 600b, AD-AND3 600c, AD-AND4 600d, each with two inputs and one output. One of the inputs on each of the AD-ANDs 600b-600d is inverted. The inputs of AD-AND2 600b are arranged to read in the two-bit address from the data tag on the first input data channel i.e. $A_1$, although the inverted input is connected to a delay line, arranged to delay the signal by one clock cycle (i.e. the time between the sequential reading of the first bit of the address and the second bit of the address). In a similar manner AD-AND3 600c is connected to read $A_1$, but in this instance $A_1$ is connected to the inverted input, while the delayed $A_1$ is connected to the non-inverted input.

The output of AD-AND2 600b is connected to the inverted input of AD-AND4 600d, while the non-inverted input of AD-AND4 600d is connected to read $A_1$. The output of AD-AND3 600c is connected to an input of AD-NOR1 600a, while the other input of AD-NOR1 is connected to read $A_1$. In this arrangement, the output of each gate AD-NOR1 600a, AD-AND2 600b, AD-AND3 600c, AD-AND4 600d provides an output of the address reader 600.

The output of AD-NOR 1 600a is connected to an input of output AND 1010 for $SW_{11}$, while AD-AND2 600b is connected to an input of output AND 1010 for $SW_{12}$, and AD-AND3 600c is connected to an input of output AND 1010 for $SW_{13}$. In a similar manner AD-AND4 600d is connected to an input of output AND 1010 for $SW_{14}$. Therefore the address reader 600 is arranged to provide a 1 value on the output associated with a switch, or a later switch, that should be switched to route the data payload on the output address.

Each AND gate 1010 in the output stage 608 comprises, in addition to the input connected to the relevant address reader 600-606, a further, inverted, input. This input may be considered a contention input 1020. As discussed above the relevant switch $SW_{ij}$ will only be activated while a 1 is produced from the AND gate, or so-called switching module 1010. To achieve this, the relevant output of the address reader 600-606 must be high (logic 1) as an address control signal and the input to the contention input 1020 must be zero (logic 0).

The controller 506 is further provided with a four control NORs 700. Each control NOR 700 comprises two inputs, and one output, and is associated with one input data channel 520-526. Therefore there is provided a separate control NOR 700 associated with the output addresses $A_1$, $A_2$, $A_3$ and $A_4$. One input to each control NOR may be considered a comparison input 702, while the other input may be considered a priority input 704 (as will be described herein). The output of each control NOR 700 is connected to the contention input 1020 of the switching modules 1010 of one input data channel switches, (e.g. the output of the first control NOR is connected to the contention input 1020 of the AND gates 1010 associated with switches $SW_{11}$, $SW_{12}$, $SW_{13}$ and $SW_{14}$).

The output of each control NOR 700 is also optically connected to an extinction line 750 associated with each particular input data channel 520-526. A high, or logic 1, on an extinction line 750 activates the packet eraser 570 to erase the packet passing on that input data channel 520-526.

Therefore it will readily be appreciated that if either of the inputs to a control NOR 700, i.e. the comparison input 702 or the priority input 704, is high (or 1) then the output of the control NOR 700 will be low (or 0). In this instance, no extinction signal will be activated for that particular input data channel 520-526, and as this signal is inverted at the contention input 1020 of the output AND gates 1010 then each of the switches associated with that input data channel 520-526 will be able to be activated by a signal from the appropriate address reader 600-606. Similarly an output 1 from the control NOR 700 will occur when, and only when, both the comparison input 702 and the priority input 704 are zero. In this instance the extinction line will be high, and thus the packet eraser 570 will be activated. In addition the contention input 1020 of the corresponding AND gates 1010 in the output stage will be zero, and thus no switching signal $O_{ij}$ will be provided and the switching element 590 will be unable to be activated by the signal from the address reader 600-606.

The logic used to provide the input to each control NOR 700, i.e. the comparison input 702 and the priority input 704, will be described herein.

The controller 506 further comprises an address input stage 609 which itself comprises six 2-bit comparators 610, 612, 614, 616, 618, 620 (similar to that described above, and as shown in FIG. 2) each of which has outputs A=B and A 'not equal to' B. Each of the comparators 610-620 is arranged to compare optically the output address information of the data tags between two input data channels 520-526 and provide two outputs: one for not equal and one for equal, as previously described. Again a data-packet travelling on an input data channel 520-526 is given the nomenclature $A_1$, $A_2$, $A_3$, and $A_4$ meaning, for example, $A_1$ being the output address on the data tag on the first input data channel 520. The six comparators 610-620 are required so that the following comparison may be made: $A_1/A_2$, $A_1/A_3$, $A_1/A_4$, $A_2/A_3$, $A_2/A_4$, $A_3/A_4$. Thus the address of the data tag on each channel is compared with the address of all other data tags. It will readily be appreciated that for each input data channel 520-526 there is provided a set of three comparators, operatively associated therewith. In the case of the third input data channel 524 for example, the following comparators are employed: $A_1/A_3$ 612, $A_2/A_3$ 616, $A_3/A_4$ 620.

It will also be readily appreciated that due to the logic of the comparators 610-620 as described above, depending upon the comparison made, the output on one of the outputs (A=B, or A 'not equal to' B) will be high, or 1, while the other will be low, or 0. Therefore to assess whether two addresses, such as $A_1$ and $A_3$, are different (i.e. to observe a high on the A 'not equal to' B output), then it is equally valid to observe the output of A=B output, and invert this signal.

The controller 506 further comprises four Compare ANDs in a comparison block 622. Each Compare AND is associated with a set of inputs such that each AND gate in the comparison block 622 compares all of the comparator 610-620 outputs for any one input data channel 520-526: i.e. the first AND gate has inputs corresponding to the three comparisons $A_1/A_2$, $A_1/A_3$ and $A_1/A_4$ such that the set comprises all comparison involving the first input data channel 520. Each Compare AND comprises three inputs, two of which are inverted and the third of which is not. The two inverted inputs are connected to the A=B output of two comparators relating to set of input data channels, while the non-inverting input is connected to the A 'not equal to' B output of the third comparator relating the same input data input channel set. Each Compare AND is therefore arranged to compare the address on one input data channel with the address on all other data channels, and provide a high output (i.e. 1) if, and only if, all the addresses do not compare, i.e. a 1 is output if all the addresses are different from the address being compared and there is no possible contention, e.g. $A_1$ 'not equal to' $A_2$, $A_1$ 'not equal to' $A_3$, $A_1$ 'not equal to' $A_4$.

The address input stage 609 and the comparison block 622 may be considered as a comparator stage.

The comparator stage therefore has four outputs. Each output provides a high signal to indicate that the address on the particular input data channel 520-526 is not the same as any of the other addresses. Each output, which may be considered as a comparator output signal, provides an input to the compare input 702 of the control NOR 700 associated with that particular input data channel 520-526.

The controller 506 further comprises a contention manager 624. The term contention manager will be readily understood by the skilled reader to mean a device, which may be implemented in software or hardware or the like, that is arranged to attempt to prevent signal collision by signal processing a system.

In the present embodiment the contention manager 624 is arranged to read, and compare the value of, the priority information within the data tag on an input data channel 520-526 with the priority information of the data tag on the other input data channels 520-526, to provide a contention signal based upon these priorities, and in addition, when these priorities are the same, give preference to the input data channel 520-526 of the highest number, e.g. give preference to $A_2$ over $A_3$ if both address and priorities are the same. As discussed, such a provision may be called a tie-breaker provision.

The contention manager 624 comprises three stages: the priority comparison stage 800; the secondary stage 810; and the contention winning AND stage 820.

The priority comparison stage 800 comprises six 1-bit comparators 626, 628, 630, 632, 634, 636. Each comparator is arranged to provide the logic A<B A>B and A=B, and thus compare the priority of the data on each set (e.g. $P_1/P_2$, $P_1/P_3$, $P_1/P_4$, where similar denotation is used here to denote the priority data of the relevant input data channels) of data input channels 520-526. In the present embodiment, only the output A<B is used. Therefore the priority comparison stage 800 comprises six outputs, and provides the logic $P_1<P_2$, $P_1<P_3$, $P_1<P_4$, $P_2<P_3$, $P_2<P_4$ and $P_3<P_4$.

The secondary stage 810 comprises twelve ANDs, each with two inputs and one output, where one of the inputs is inverted, i.e. logic module 110 in FIG. 1. One input on each AND is connected to an output of the priority stage 800, while the other is connected to an output of the relevant two-bit comparator 610-620 from the comparison stage 609. Each AND in the secondary stage 810 is shown with the nomenclature i-j, (i.e. $AND_{i,j}$) whereby, for example, the inverted input of $AND_{1-2}$ is connected to $A_1$ 'not equal to' $A_2$ output from the two-bit comparator 610 arranged to compare $A_1$ with $A_2$ in the comparison stage 609 and the non-inverted input is connected to output of the 1-bit comparator $P_1<P_2$ in the priority stage 810.

The output of $AND_{1-2}$ produces a high logic in the situation where $A_1=A_2$ AND $P_1<P_2$, thus indicating that the data packet on the second input address channel should win the contention between the two. The output of $AND_{1-2}$ may be considered as $C_{1-2}$ (i.e. contention 1-2), whereby there is provided a high output if $A_2$ should win over $A_1$.

In this arrangement, i.e. using only the $P_1<P_2$ output from the priority stage 800, it should be apparent to the skilled reader that in the situation where $P_1=P_2$, no high output will be made from the 1-bit comparator and thus the output from $AND_{1-2}$ will be low and therefore data on $A_1$ will win over $A_2$ in this instance. The present embodiment therefore provides the tie-breaker logic, in which the data from the lowest channel wins if the priorities and the output address are the same.

It will be readily appreciated also that when comparing the contention in the second stage 810 of the contention manager 624, that it would be equally valid, in the case of $AND_{2-1}$ for example, to provide the non-inverted input from the $A_1=A_2$ output of the comparator stage 609 and provide the inverted input from $P_2>P_1$, i.e. $P_1<P_2$.

The secondary stage 810 is provided therefore with twelve outputs, corresponding to three outputs per set, i.e. $C_{1-2}$, $C_{1-3}$, $C_{1-4}$, $C_{2-1}$, $C_{2-3}$, $C_{2-4}$, $C_{3-1}$, $C_{3-2}$, $C_{3-4}$, $C_{4-1}$, $C_{4-2}$, $C_{4-3}$, wherein a high is provided if the latter postfix should win over the former postfix. It should be appreciated therefore, considering the discussion above, that if this signal is inverted (by means of an NOT gate say) then the opposite is true, i.e. that the former postfix should win over the latter postfix.

The final stage of the contention manager is the contention winning AND stage 820, which comprises four contention winning ANDs, or CW-ANDs: CW-1, CW-2, CW-3, CW-4. Each CW AND has three inverted inputs and one output. It will readily be appreciated that the combination of logic modules 140 and 130 in FIG. 1 provide such logic, as is the case here. The inputs of each and are provided by the output from the relevant set from the twelve outputs from the secondary stage 810 of the contention manager 624. Thus, in the example of $C_{1-2}$, $C_{1-3}$, $C_{1-4}$, these are all passed to CW-1, whereby each input is inverted. The output of CW-1 will therefore be high if, and only if, the address A1 on the first data input channel 520 should win over $A_2$ AND $A_3$ AND $A_4$. The output signal of the contention managed may be considered to be a priority output signal.

The priority output signal of CW-1 is then passed to the priority input 704 of the Control NOR 700 associated with the first data input channel 520, and thus the data packet on the relevant data input channel is not extinguished and the switching elements 590 associated with this channel may be activated when the logic on the priority input is high (or logic 1). The same configuration is used for all further CW-2, CW-3, CW-4.

It should be appreciated that the output of a Control NOR 700 will be low (i.e. acting to enable the relevant switching modules 1010 and not to extinguish the packet) when either the priority output signal or the comparator output signal are high.

By using the 1-bit and N-bit optical comparators in this manners, as well as the optical logic gates the controller 506 described is able to control optically (and in this instance entirely optically) the interconnection network of FIG. 5.

Figure 7:
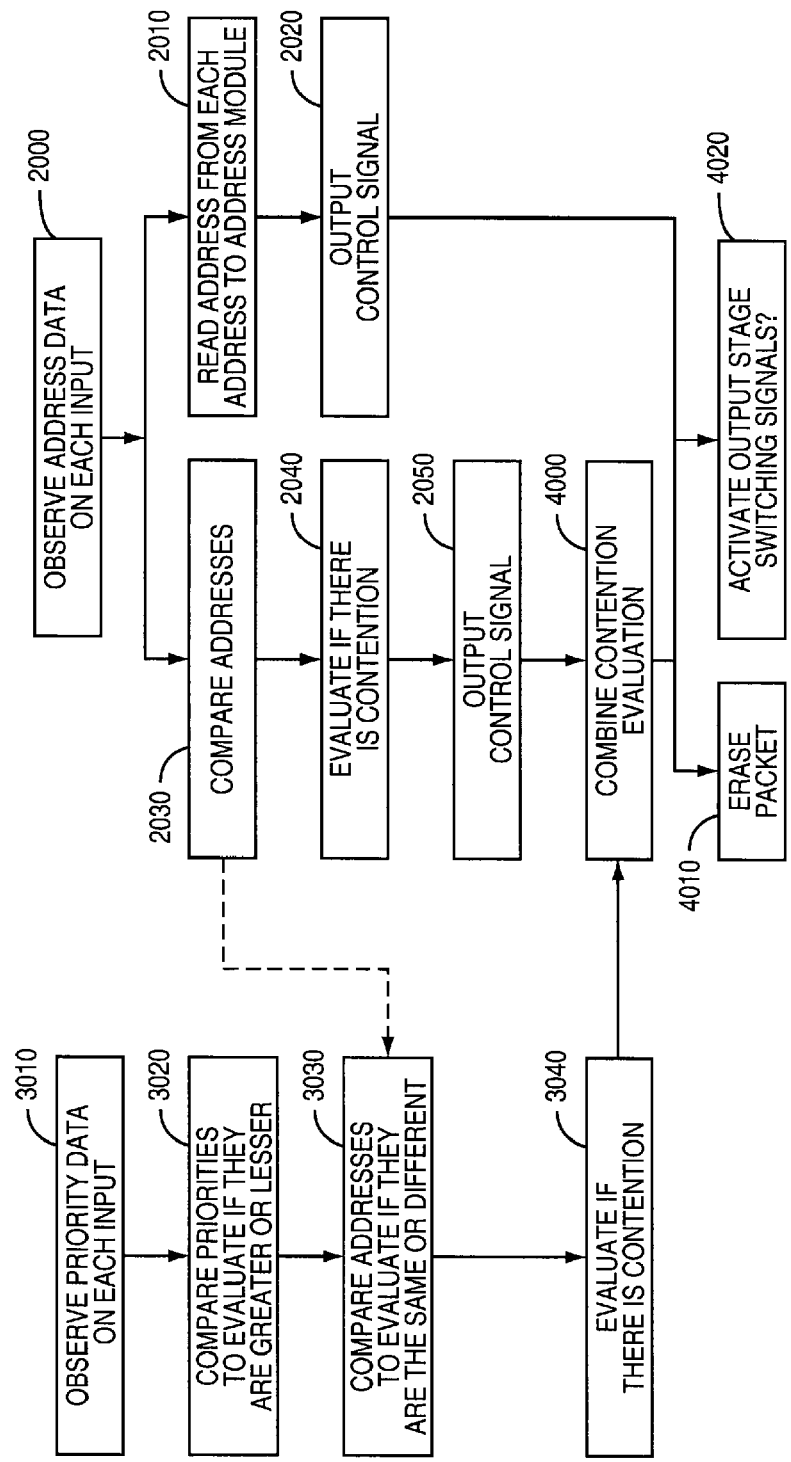
FIG. 7 shows a flow diagram of the operation of an optical controller.

FIG. 7 details a flow chart indicating the steps taken when evaluating optically the routing of data packets that pass through the optical interconnection network.

Step 2000 optically observes the address data in the data tag. This information is passed 2010 to the relevant optical address reader, which is able to output an address optical switch control signal 2020.

At the same time, the addresses on one input data channel are compared 2030, and it is evaluated 2040 if there is a contention. If there is, a contention signal is produced 2050.

The controller 506 is also arranged to read 3010 the priority data from the data-tag, and compare 3020 the priorities from one input data channel with all the further input data channels. The controller is further arranged to again compare 3030 the addresses on one input data channel with all other input data channels. While this may be provided as a further step, this information may also be provided from step 2030. As such a dashed line is shown in FIG. 7 to highlight this. Both the address compare 3030 and the priority compare 3020 are used to evaluate a priority contention signal 3040.

This priority contention signal is combined 4000 with the address contention signal to evaluate if the relevant switching modules 1010 within the output stage 608 should be activated, or de-activated and the relevant data-packet should be erased 4010.

If the switches should be enabled, then the signal from the combination is further combined with the relevant output an address optical switch control signal 2020 and the output stage produces a signal to control the relevant switching element 590.

It should be readily appreciated that the embodiment described above is only one example of such a configuration and it is envisaged that many further configurations will be possible, including implement three-bit, four-bit, etc. configurations. A skilled person will readily be able to implement such a controller and network.

In addition it is envisaged that while in the present embodiment there is provided the use of a priority bit to evaluate the contention, this needs not be used. Indeed the system may operate without the use of a priority check and may be implemented with tie-breaker policy only, or other contention system.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. An optical switch controller configured to control an optical interconnection network that variably connects at least one input data channel to a plurality of output channels via at least one switching element, the optical switch controller comprising:
   an address reader module having at least one semiconductor optical amplifier, the address reader module configured to:
      process an optical signal;
      read a data tag from the at least one input data channel to obtain information; and
      output at least one address control signal based upon the information read from the data tag, wherein the address control signal is configured to control one or more switching elements in an optical interconnection network;
a comparator stage configured to:
read the data tag from at least two input data channels; and
output at least one comparator output signal to indicate whether the information within the data tags read from the at least two input data channels is the same or different; and
an output stage configured to:
receive the address control signal; and
output an output signal based on both the address control signal and the comparator output signal.

2. The optical controller of claim 1 wherein the output stage comprises at least one semiconductor optical amplifier, and is configured to process the optical signal.

3. The optical controller of claim 1 wherein the comparator stage is configured to read a destination address from the data tag.

4. The optical controller of claim 1 further comprising:
a contention manager configured to read priority information from the data tag from at least two input data channels; and
output at least one priority output signal according to the priority information; and
wherein the output stage is further configured to output the output signal based on both the address control signal and the priority output signal.

5. The optical controller of claim 4 wherein the contention manager is configured to generate the priority output signal to indicate that the priority information within the data tag has a lower priority than the priority information in another data tag.

6. The optical controller of claim 4 wherein if the data tags read from different input data channels indicate that the different input channels are to be concurrently connected to the same output channel with the same priority, then the contention manager is further configured to employ a tie-breaker to determine which of the input data channels should be connected to the output channel.

7. The optical controller of claim 4 wherein the contention manager comprises at least one semiconductor optical amplifier configured to carry out the signal processing optically.

8. The optical controller of claim 1 further comprising at least one extinction line configured to provide an extinction signal to an interconnection network to indicate that a data packet on an input data channel should be erased.

9. The optical controller of claim 1 wherein the optical controller is configured to control a 4×4 interconnection network.

10. An interconnection network comprising:
an optical switch controller configured to:
control an optical interconnection network that variably connects at least one input data channel to a plurality of output channels via at least one switching element; and
an address reader module in the optical switch controller, and having at least one semiconductor optical amplifier, the address reader module configured to:
process an optical signal;
read a data tag from the at least one input data channel to obtain information; and
output at least one address control signal based upon the information read from the data tag, wherein the address control signal is configured to control one or more switching elements in an optical interconnection network;
a comparator stage configured to:
read the data tag from at least two input data channels; and
output at least one comparator output signal to indicate whether the information within the data tags read from the at least two input data channels is the same or different; and
an output stage configured to:
receive the address control signal; and
output an output signal based on both the address control signal and the comparator output signal.

11. A method of optically controlling an interconnection network configured to variably connect at least one input data channel to a plurality of outputs channels via at least one switching element, the method comprising:
reading information within a data tag from at least one input data channel using an address reader;
processing the information to generate an address control signal based on the information read from the data tag;
switching elements within an interconnection network using the address control signal;
using at least one semiconductor optical amplifier to read the information within the data tag, and to process the information to generate the address control signal;
reading, at a comparator stage, the data tag from at least two input data channels;
outputting, from the comparator stage, at least one comparator output signal to indicate whether the information within the data tags read from the at least two input data channels is the same or different;
receiving, at an output stage, the address control signal; and
outputting, from the output stage, an output signal based on both the address control signal and the comparator output signal.

* * * * *